Figure 2:
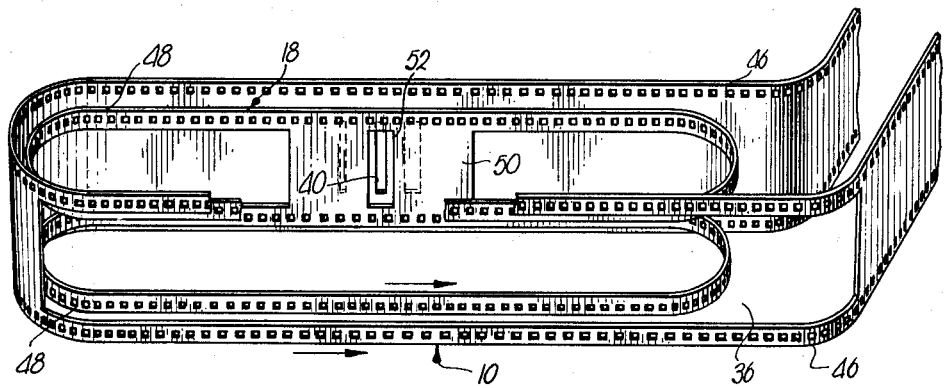

June 29, 1965  J. S. FINDLAY  3,191,515
HIGH SPEED AERIAL CAMERA SHUTTER
Filed Aug. 9, 1963  2 Sheets-Sheet 1

INVENTOR.
John Scott Findlay
BY
Hovey, Schmidt, Johnson & Hovey
ATTORNEYS.

June 29, 1965  J. S. FINDLAY  3,191,515
HIGH SPEED AERIAL CAMERA SHUTTER
Filed Aug. 9, 1963  2 Sheets-Sheet 2

INVENTOR.
John Scott Findlay

United States Patent Office 3,191,515
Patented June 29, 1965

3,191,515
HIGH SPEED AERIAL CAMERA SHUTTER
John Scott Findlay, Wilmette, Ill., assignor to Memory Systems of Missouri, Inc., Kansas City, Mo., a corporation of Missouri
Filed Aug. 9, 1963, Ser. No. 301,142
13 Claims. (Cl. 95—57)

This invention relates generally to camera shutters and, more specifically, to improvements in focal plane shutters for use in high speed aerial cameras and the like.

Focal plane shutters find wide usage in cameras where very high shutter speeds are employed, a prime example being aerial cameras which oftentimes are mounted in high speed, low flying jet aircraft. Generally speaking, conventional leaf-type or compur shutters are incapable of operation at speeds in excess of $\frac{1}{500}$ seconds, it then being necessary to resort to focal plane shutters in order to obtain the desired speeds with proper picture definition.

Focal plane shutters in common use heretofore generally employ an opaque curtain having a slit therein which scans the film to expose the latter when the curtain is advanced across the film. Limitations in this arrangement arise principally due to mechanical considerations and cost, the two factors being closely interrelated since the vibration of the curtain produced in these systems can only be remedied by increased complexity and higher tolerances of the mechanical driving components. Such vibrations produce a ripple or edging effect visible on the exposed film when the latter is enlarged for study, such as in aerial reconnaissance. Therefore, it may be appreciated that there is a definite need for improvement in this field since higher speeds are only useful in aerial reconnaissance if the enlargements of the exposed film can be read.

An improvement over the focal plane shutter mentioned above, which is reciprocated back and forth across the film by its mechanical drive mechanism, is the endless curtain which is driven continuously in only one direction. Since it is not necessary to reciprocate the endless curtain, mechanical vibration thereof and criticality of the driving components is greatly reduced permitting higher usable speeds than obtainable with the reciprocating shutter.

The endless curtain shutter arrangement, however, has inherent limitations in that only one film-scanning slit can be placed in each curtain. This means that multiple shutter speeds must be obtained by varying the drive speed of the curtain. Alternatively, of course, separate curtains may be used for the different speeds, but it is evident that changing curtains is time-consuming besides being impractical in many applications.

It is, therefore, the primary object of this invention to provide an improved focal plane shutter of the continuous curtain type permitting multiple shutter speeds and high speed changing from one shutter speed to another.

It is another object of this invention to provide a very high speed, focal plane shutter employing a pair of continuous curtains, one of the curtains containing film-scanning slits of different widths while the other curtain is employed to selectively permit a desired slit to expose the film.

It is still another object of this invention to provide means for rapidly opening and closing the slit in a continuous curtain-type focal plane shutter.

Still another object of this invention is to provide means for opening and closing the slit as aforesaid by employing a second continuous curtain carrying a blind, the two curtains being relatively shiftable to position the blind either in alignment or out of alignment with the slit.

Still another object of this invention is to provide shutter apparatus employing a pair of continuous curtains that permits the selection of various camera speeds without varying the drive speed of the curtains or changing the size of the film-scanning slit.

Yet another object of the instant invention is to provide a focal plane shutter that may be employed when it is desired to take a time exposure as well as when normal, high speed shutter operation is desired.

Other objects will become apparent as the detailed description proceeds.

Figure 1:
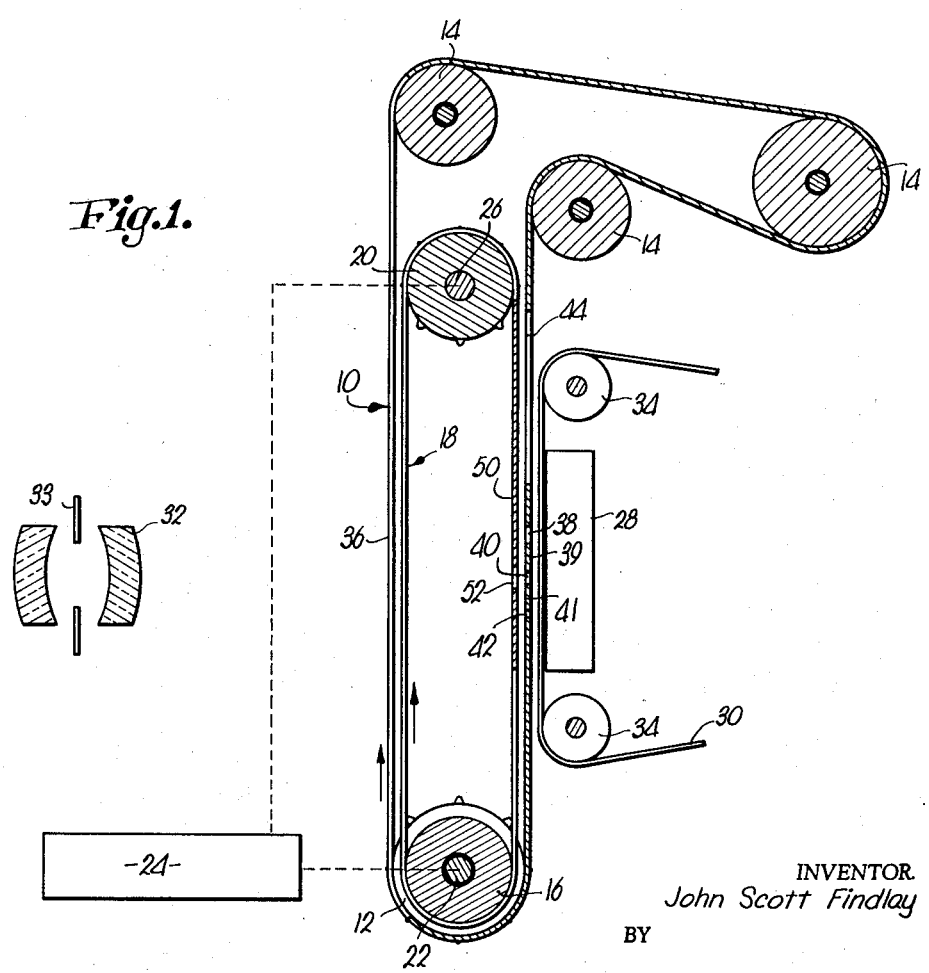
Figure 3:
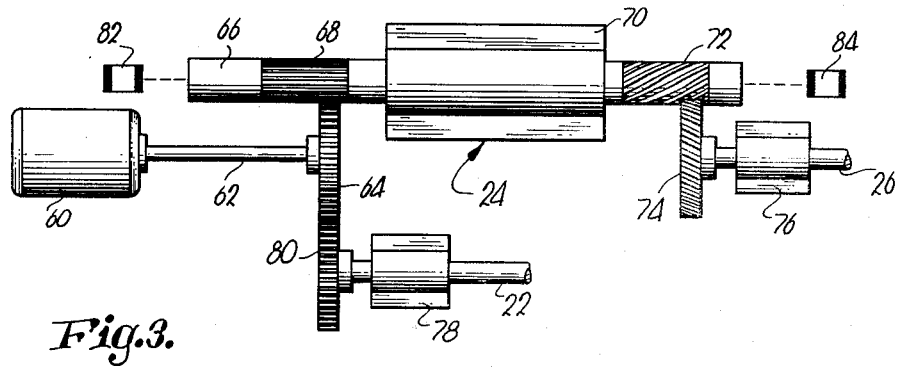
Figure 4:
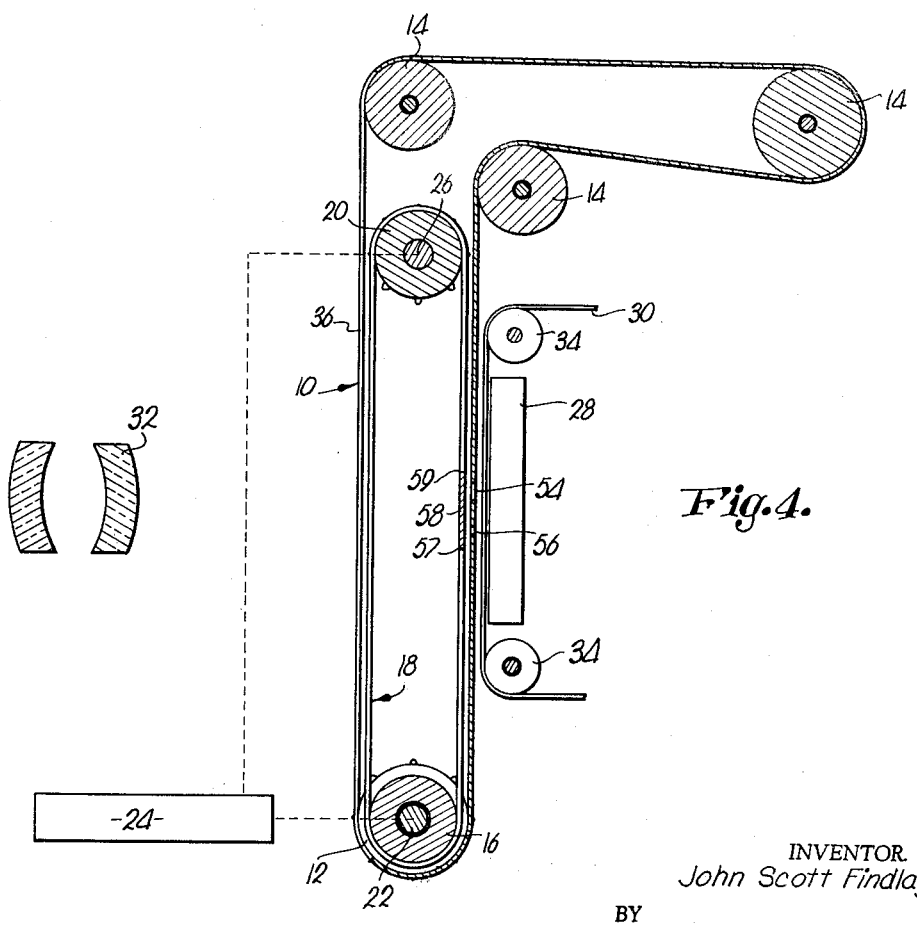

In the drawings:
FIGURE 1 is a view of the instant invention showing the same in diagrammatic form, the curtains being shown in longitudinal cross section to reveal the open and the opaque portions thereof;
FIG. 2 is a perspective view of the two curtains employed in the instant invention;
FIG. 3 is a view of the drive mechanism of the invention shown partially in elevation and partially in diagrammatic form; and
FIG. 4 is a view of an alternative arrangement of the invention showing the same in diagrammatic form, the curtains being shown in longitudinal cross section to reveal the open and the opaque portions thereof.

Referring to FIG. 1, the numeral 10 denotes a continuous or endless curtain trained around a rotatable sprocket wheel 12 and three idler rollers 14. Coaxial with drive sprocket 12 is an idler roller 16 which receives an endless curtain or member 18. Member 18 is trained around a drive sprocket 20 disposed between opposed stretches of curtain 10.

Roller 16 rotates freely about a shaft 22 while drive sprocket 12 is rigid with the shaft and receives driving force therefrom. Driven shaft 22 is operably coupled with a drive mechanism 24 to be fully described hereinafter. Mechanism 24 also drives sprocket 20, the latter being rigid with a driven shaft 26 operably coupled with the mechanism.

A platen 28 supports a film 30 for exposure of the film by light rays directed thereto by a lens assembly 32. Assembly 32 is provided with a between lens shutter 33 which may be of the Compur type. Rollers 34 direct film 30 across platen 28 when the film is advanced by feed and take-up spools (not shown). It may be appreciated, therefore, that the diagrammatic representation of FIG. 1 is a fragmentary showing of a camera apparatus.

In FIGS. 1 and 2 it may be seen that curtain 10 has a wide aperture 36 and three film-scanning slits 38, 40 and 42 therein. Another aperture 44 in curtain 10 is disposed in closely spaced relationship to the slits. The remaining portions of the curtain are opaque and incapable of transmitting light therethrough. As is evident in FIG. 2, the edges 46 of curtain 10 are perforated to receive the teeth of drive sprocket 12.

It may be noted that the breadth of aperture 36 (i.e., longitudinally of curtain 10) is large relative to the platen 28 upon which the film is disposed. It will be appreciated, when the operation of the apparatus is discussed later in this specification, that aperture 36 must be at least approximately twice the width of the film to be exposed in order that the opaque portions of curtain 10 will not block passage of light through the film-scanning slit during exposure of the film.

Member 18 comprises a pair of parallel tracks 48 containing perforations which are engaged by the teeth of drive sprocket 20. It may be appreciated that the perforated edges or tracks of curtain 10 and member 18 are identical, the difference in the construction of the two curtains being that the tracks 48 of member 18 are interconnected only by an opaque shield or blind 50. In other words, curtain 10 is a continuous strip or tape and is cut away only at apertures 36 and 44 and at slits 38–42, while member 18 is cut away or open between the tracks 48 except for the opaque shield 50. In this regard, it should be noted that shield 50 is shown extended in FIG. 1 to overlie aperture 44 in curtain 10 for reasons to be explained hereinafter, while in FIG. 2 neither the aperture 44 nor the corresponding extension of shield 50 is shown.

Shield 50 has a transverse opening 52 therein which is employed to select the slit in curtain 10 which is to be used in scanning film 30 during exposure thereof. Opening 52 is shown aligned with slit 40, the remaining slits 38 and 42 being blocked by shield 50. The interaction of opening 52 with slits 38–42 will be discussed fully when the operation of the invention is set forth hereinafter, it being sufficient at this juncture to understand that curtain 10 and member 18 are relatively shiftable so that opening 52 may be selectively aligned with any one of the slits 38–42. Furthermore, it should be noted that opaque segments 39 and 41 separating slits 38–42 are of greater width than opening 52 so that the opening may be normally disposed in alignment with one of the segments to prevent exposure of film 30.

Referring now to FIG. 4, it may be seen that in this alternative arrangement of the invention a curtain 10 is employed having only the aperture 36 therein and a pair of slits 54 and 56. Member 18 employs a single, opaque blind 58 having opposed margins 57 and 59 spaced longitudinally of the member. Blind 58 normally overlies slits 54 and 56 in light-blocking relationship thereto as shown. Except for these modifications and the omission of shutter 33 from lens assembly 32, the structure shown in FIG. 4 is identical with that as shown in FIG. 1.

The drive mechanism 24 is shown in FIG. 3. The numeral 60 denotes a prime mover in the form of an electric motor. Motor 60 has an output shaft 62 provided with a gear 64 rigid therewith. A shaft 66 is provided with a band of rectilinear, longitudinally extending lands 68 which are engaged with the teeth of gear 64.

Shaft 66 is longitudinally shiftable and is mounted in a bushing 70. A band of helical lands 72 couples the shaft with the mating teeth of a gear 74, gear 74 being rigid with the driven shaft 26 journalled in bushing 76.

Driven shaft 22 is shown in FIG. 3 journalled in bushing 78, shaft 22 being coupled with gear 64 by means of a mating gear 80 rigid with the shaft. Solenoids 82 and 84 are operably coupled with shaft 66 for reciprocating the latter, shaft 66 being shown in FIG. 3 in its leftwardly shifting position with solenoid 82 energized. Thus, it may be appreciated that shafts 22 and 26 are both driven from a common prime mover 60 but that shaft 26 may be advanced or retarded with respect to shaft 22 during operation of the prime mover by energization of the appropriate solenoid 82 or 84.

Before the operation of the invention is set forth in detail it should be clearly understod that member 18 and curtain 10 must be driven at the same surface speed in order to maintain the shield or blind carried by the member in the desired relationship to the slits in the curtain. Therefore, it is requisite that the drives for the two curtains be synchronized so that, although the shield or blind may traverse the film a number of times for each passing of the slits, the shield or blind will return to proper alignment with the slits each time the latter traverse the film. It is convenient for this reason to make the length of member 18 an integral submultiple of the length of curtain 10.

In the operation of the invention, the arrangement in FIG. 1 is especially useful when flexibility of operation is of importance. More specifically, this structure provides multiple shutter speeds through the use of a plurality of slits of different widths in the curtain and also provides the additional time exposure mode. It is evident that additional slits of different widths may be added to the slits 38–42 shown in order to obtain a greater number of speeds.

Assuming the dispositions of shield 50 and the slits 38–42 as shown in FIG. 1, energization of motor 60 produces rotation of the drive sprockets 12 and 20 to advance the two curtains while maintaining opening 52 in alignment with slit 40. Because of the synchronization discussed in the preceding paragraph, slit 40 will move across film 30 or platen 28 and record the image on the film produced by the light rays emanating from lens assembly 32. After slit 40 has traversed the platen, the opaque portions of curtain 10 (and the extension of shield 50 covering aperture 44) will cover the platen and prevent further exposure of the film thereon. Since the film will be exposed once for each complete revolution of curtain 10, film 30 is advanced by conventional means (not shown) between exposures so that an unexposed frame is present on platen 28 each time slit 40 moves thereacross.

For use with the apparatus shown in FIG. 1, mechanism 24 may be provided with means (not shown) biasing the shaft 66 toward a normal position where gears 64 and 74 are engaged with the central portions of the corresponding bands of lands 68 and 72. This normal position may correspond to alignment of opening 52 with slit 40. Energization of solenoid 82 or solenoid 84 then produces leftward or rightward shifting, respectively, of shaft 66 to advance or retard driven shaft 26 to, in turn, move opening 52 out of alignment with slit 40 and into alignment with slit 38 or slit 42. Therefore, rapid changing of shutter speed may be achieved between exposures by controlling the states of the solenoids 82 and 84.

Shutter 33 may also be employed in the operation of the FIG. 1 apparatus. If it is not desired to advance film 30 to an unexposed frame during each complete rotation of curtain 10, shutter 33 may be closed after each exposure and reopened at a later time for a subsequent exposure. Attention is directed to the fact that the speed achievable with a continuous curtain are quite high (on the order of 200 inches per second and greater) without the distortion effects discussed earlier; therefore, it may not be convenient or possible to shift film 30 rapidly enough to place an unexposed frame on the platen before the slit returns to effect another exposure. Hence, shutter 33 may be synchronized with the drive apparatus and the film feed to permit an exposure each time the curtain rotates a predetermined number of times.

If time exposure operation is desired, shield 50 may be shifted until aperture 44 is no longer blocker, whereupon the drive mechanism may then be stopped with the aperture 44 overlying platen 28. Shutter 33 then controls the exposure time.

Additionally, the apparatus shown in FIG. 1 may be operated with opening 52 normally aligned with one of the opaque segments 39 or 41. Shuttter 33 may then be left open (or removed from the apparatus, if desired) and mechanism 24 employed to shift member 18 to align opening 52 with a desired slit when exposure of film 30 is desired. Opening 52 may then be returned to its original or normal position following exposure, thereby providing rapid opening and closing of the selected slit at the desired time through the use of member 18 as the sole shuttter of the apparatus.

Referring now to FIG. 4, it may be seen that this alternative arrangement of the invention employs only two slits 54 and 56 and that the blind 58 normally blocks passage of light through both of these slits. Note the absence of a between lens shutter in the FIGURE 4 structure. Thus, member 18 is the only shutter provided in this version of the apparatus.

In the operation of the FIG. 4 arrangement, drive mechanism 24 operates to shift member 18 relative to curtain 10 in either direction a distance sufficient to uncover either slit 54 or slit 56 when it is desired to expose the film. In this manner, very high speed shutter operation is obtainable. One of the slits 54 or 56 may be opened or uncovered and the apparatus then continually driven with the two curtains in this disposition, while film 30 is shifted between exposures to place an unexposed frame on platen 28.

Alternatively, mechanism 24 through alternate energization and de-energization of solenoid 82 or 84 may be employed to rapidly open and close the desired slit. In this mode of operation, shifting of shaft 66 is effected prior to movement of the desired slit across the film to be exposed, whereupon, after the slit exposes the film, return of shaft 66 to its center position moves blind 58 back into blocking or closing relationship with the slit. Advancement of film 30 to place the next frame on platen 28 may then be effected at a slower rate without danger of re-exposing the picture just taken.

It should be understood that automatic control apparatus could be employed in the instant invention to operate solenoids 82 and 84 in a manner to effect the desired control function. The presence of two driven shafts 22 and 26, each controlling a separate curtain and driven from a single source 60, facilitates synchronization of such control apparatus with the two curtains. Furthermore, the invention readily lends itself to programmed operation, a feature especially useful in remote control operations such as may be encountered in aerial reconnaissance.

Having thus described the invention, what is claimed as new and desired to be secured by Letters Patent is:

1. In a camera having structure for directing light rays onto a sensitive film:
    an endless, opaque curtain having at least one film-scanning slit and a wide aperture therein spaced from the slit, said curtain being mounted for rotation between said structure and said film with the slit moving across the film during said rotation, the aperture permitting passage of said rays through the slit and onto the film during an exposure;
    an endless member provided with a blind, said member being mounted for rotation between said structure and said film with the blind normally aligned with said slit during said movement thereof across the film to prevent said rays from exposing the film; and
    structure operably coupled with said curtain and said member for driving the curtain and member, said structure including means for changing the relative positions of the slit and the blind to expose the film when the slit moves thereacross.

2. The invention of claim 1, wherein said member comprises a pair of spaced, parallel tracks, said blind spanning the distance between the tracks, said structure being coupled with said tracks.

3. The invention of claim 1, wherein said structure drives said curtain and said member at the same speed except during operation of said means.

4. The invention of claim 1, wherein said means causes relative movement of the curtain and the member.

5. The invention of claim 4, wherein said curtain has a second wide aperture therein in closely spaced relationship to said slit, said blind normally being in aligned, ray-blocking relationship to said second aperture whereby, upon shifting of the curtain and member to position said blind out of alignment with the second aperture, the latter may be disposed between the structure and the film to take a time exposure.

6. In a camera having structure for directing light rays onto a sensitive film;
    an endless, opaque curtain having a pair of spaced, film-scanning slits and a wide aperture therein spaced from the slits, said curtain being mounted for rotation between said structure and said film with the slits moving across the film during said rotation, the aperture being disposed between the structure and the film during said movement of the slits thereacross;
    an endless member provided with a blind having opposed margins spaced longitudinally of the member, the blind being entirely opaque between said margins, said member being mounted for rotation between said structure and said film with the blind normally aligned with said slits during said movement thereof across the film to prevent said rays from exposing the film; and
    structure operably coupled with said curtain and said member for driving the curtain and member, said structure including selectively operable means for causing relative movement of the curtain and the member in one direction to change the relative positions of the slits and the blind to permit passage of said rays through one of said slits, and for causing relative movement in the opposite direction to change said relative positions to permit passage of said rays through the other slit, whereby passage of the rays through the selected slit and onto the film exposes the latter when the slits move across the film.

7. The invention of claim 6, wherein said slits extend transversely of the curtain and are of different widths whereby to provide different shutter speeds without changing the drive speed of the curtain.

8. The invention of claim 6, wherein said one slit is out of alignment with said blind after said means effects said relative movement in said one direction, the other slit being out of alignment with said blind after said means effects relative movement in the opposite direction.

9. In a camera having structure for directing light rays onto a sensitive film:
    an endless, opaque curtain having a plurality of transverse, spaced, film-scanning slits therein and a wide aperture therein spaced from the slits, said curtain being mounted for rotation between said structure and said film with the slits moving across the film during said rotation, the aperture being disposed between the structure and the film during said movement of the slits thereacross;
    an endless member provided with an opaque, slit-selecting shield having an opening therein, said member being mounted for rotation between said structure and said film with the opening in the shield aligned with one of said slits, and the remainder of the shield in ray-blocking relationship to the other slits, during movement of the slits across the film to expose the latter; and
    structure operably coupled with said curtain and said member for driving the curtain and member, said structure including selectively operable means for causing relative movement of the curtain and the member to change the relative positions of the slits and the shield to permit passage of said rays through said opening and any one of said other slits when the selected other slit moves across the film whereby to expose the latter with rays passing through any slit selected.

10. The invention of claim 9, wherein said slits extend transversely of the curtain and are of different widths, whereby to provide different shutter speeds without changing the drive speed of the curtain.

11. The invention of claim 9, wherein is provided a shutter disposed in the path of travel of said rays to the film.

12. In a camera having structure for directing light rays onto a sensitive film:
    a pair of endless curtains mounted for rotation between said structure and said film, the first curtain being opaque and having a film-scanning slit and a wide aperture therein spaced from the slit, the second curtain being provided with a blind; and
    mechanism for driving the curtains and for shifting one curtain relative to the other curtain between a first position where the blind is in aligned, ray-blocking relationship to said slit and a second position where the blind and the slit are out of alignment to expose the film when the latter is scanned by the slit, said mechanism comprising:
    a prime mover having an output shaft;

a driven shaft;

a longitudinally shiftable shaft for transmitting rotative motion from said output shaft to said driven shaft, said shiftable shaft having a first portion thereof provided with rectilinear, longitudinally extending lands therearound and a second portion thereof provided with helical lands therearound;

means operably coupling said output shaft with said other curtain and with one of said portions of the shiftable shaft, said means being slidably engaged by the lands of said one portion;

structure operably coupling said driven shaft with said one curtain and with the other portion of the shiftable shaft, said structure being slidably engaged by the lands of said other portion; and means operably coupled with said shiftable shaft for moving the latter longitudinally thereof between a pair of predetermined locations corresponding to said pair of positions of said one curtain, whereby to advance or retard the driven shaft with respect to the output shaft to shift the one curtain between said positions.

13. The invention of claim 12, wherein said means and said structure each include a gear having teeth in mating engagement with corresponding lands.

References Cited by the Examiner
UNITED STATES PATENTS 2,931,284   4/60   Vinten _____ 95—57

JOHN M. HORAN, *Primary Examiner*.